United States Patent [19]

Caero

[11] 4,128,047
[45] Dec. 5, 1978

[54] ACTUATOR WITH LOCKING VALVES

[75] Inventor: Jose G. Caero, Fort Worth, Tex.

[73] Assignee: Textron Inc., Providence, R.I.

[21] Appl. No.: 815,675

[22] Filed: Jul. 14, 1977

Related U.S. Application Data

[63] Continuation of Ser. No. 604,625, Aug. 14, 1975, abandoned.

[51] Int. Cl.² .................. F15B 11/08; F15B 13/04
[52] U.S. Cl. ......................... 91/420; 91/391 R; 91/508; 91/437; 91/445; 137/624.27
[58] Field of Search ............ 91/391, 411 A, 445, 91/437, 447, 448, 420, 431, 433, 452, 426, 453, 413; 137/624.27

[56] References Cited

U.S. PATENT DOCUMENTS

| | | | |
|---|---|---|---|
| 2,572,705 | 10/1951 | Edman | 91/445 |
| 3,158,068 | 11/1964 | Bokelman | 91/391 R |
| 3,908,515 | 9/1975 | Johnson | 91/445 |
| 3,933,176 | 1/1976 | Wheeler | 137/596 |
| 3,939,870 | 2/1976 | Giugliano | 137/624.27 |
| 4,034,815 | 7/1977 | Dezelan | 91/437 |

FOREIGN PATENT DOCUMENTS 2454259  5/1975  Fed. Rep. of Germany ........ 91/411 A

*Primary Examiner*—Martin P. Schwadron
*Assistant Examiner*—Abraham Hershkovitz
*Attorney, Agent, or Firm*—Richards, Harris & Medlock

[57] ABSTRACT

A hydraulic actuator having two balanced area actuator pistons, each controlled by the movement of a primary servo sleeve to supply pressurized fluid from a pressure fluid source to one side of the actuator piston and to allow return flow from the opposite side of the piston. Piston movement is reversed by translation of the primary servo sleeve. A blocking valve is in each flow line between the servo sleeve and the cylinders in which each piston moves. A flow channel from the pressure fluid source applies pressure to the shut off valves to maintain the valves normally open for flow of control fluid to and from the actuator pistons. Means, operable upon loss of fluid pressure, are provided for closing the shut off valves to maintain existing pressure on both sides of the actuator pistons automatically to maintain reactive loads in each actuator half. Upon pressure loss, disengagement of the shut off valves may be accomplished by stroking a secondary spool associated with the primary servo spool and responsive to over travel of the primary servo spool to displace a ball which in turn mechanically displaces the shut off valves to allow passage of fluid to and from the actuator cavities thereby permitting an equalization of pressure on both sides of the actuator piston.

9 Claims, 4 Drawing Figures

ACTUATOR WITH LOCKING VALVES

This is a continuation of application Ser. No. 604,625, filed Aug. 14, 1975, now abandoned.

FIELD OF THE INVENTION

This invention relates to a servo valve controlled hydraulic actuator and more particularly to servo valve means for control of reactive loads upon hydraulic pressure failure.

PRIOR ART

The control of an aircraft in flight is primarily by the movement of control surfaces to increase or decrease lift on the control surfaces. The control surfaces are generally operated by servo valve controlled hydraulic actuators. Utilizing hydraulic actuators, the pilot may vary the position of the control surfaces by movement of the pilot's control stick connected to a spool of the servo valve. Movement of the servo valve directs hydraulic fluid under pressure to the piston head of a hydraulic actuator, the movement of which in turn controls the position of the control surfaces.

In servo controlled actuators of conventional design, leakage from the actuator cavities through the servo valve prevents the actuator from maintaining a reactive load after hydraulic pressure failure. The inability of the actuator to maintain reactive loads after hydraulic failure causes the actuator piston to move freely within its cylinder or to continually retreat until it is moved to an extreme stop position. As a result, upon hydraulic pressure loss, the control surface will move to a neutral lift position and any maneuver being executed by the aircraft will be abruptly interrupted.

SUMMARY OF THE INVENTION

In accordance with the present invention, problems involved with the prior art systems are eliminated by providing a servo controlled actuator piston capable of maintaining a reactive load after a hydraulic pressure failure. The hydraulic actuator consists of a balanced area actuator piston. The piston is controlled by the movement of a primary servo spool which is adapted to supply pressurized fluid from a pressure fluid source to one side of the piston and to allow return flow from the opposite side of the piston. Movement of the piston is reversed by translation of the primary servo spool within the actuator housing. Included in the valve means for the piston is a blocking or shut off valve in the flow line between the servo spool and the cylinder in which the piston moves. A flow channel from the pressure fluid source applies pressure to the shut off valve to maintain the valve normally open for flow of control fluid to and from the actuator piston. Means, operable upon loss of fluid pressure, are provided for closing the shut off valve to maintain existing pressure on both sides of the actuator piston during pressure loss. In this way, the valves are automatically set to maintain reactive loads in the actuator upon pressure loss provided that the cylinder, actuator piston and piston rod, and their respective seals, are capable of maintaining pressure within their cavities.

In a dual valve system, engagement of the shut off valve is accomplished by the exertion of fluid pressure on a pressure sensitive valve, mechanically interconnected to control a similar shut off valve in a second actuator. Thus, the valves are open so long as there is hydraulic system pressure in either actuator, and the valves are automatically closed upon loss of hydraulic pressure.

Upon pressure failure, disengagement of the shut off valves may be accomplished by stroking a secondary spool associated with the primary servo spool and responsive to over travel of the primary servo spool. Stroking of the secondary spool displaces a ball or cam which in turn mechanically displaces the shut off valve to allow passage of fluid to and from the actuator cavities thereby permitting an equalization of pressure on both sides of the actuator piston. This permits the pilot to release the reactive loading sustained by the actuator pistons as a result of forces on the control surfaces and thereby bring the control surfaces to a new position or reposition the actuator.

In accordance with another aspect of the invention, the blocking valves are actuated by the movement of a cam means forcing the valves to an open position wherein the cam means are actuated by the action of a piston moving in response to fluid pressure in a flow channel acting on the piston.

In accordance with still another aspect of the invention, the cam means are spherical balls and the shut off valves are formed with opposing conical faces upon which the spherical balls act. The piston member acting on the spherical balls consist of a force piston joined mechanically to a piston having a conical face which acts against the spherical balls as the force piston is translated. The movement of the piston acting on the spherical balls causes the shut off valves to be moved to an open position, thereby permitting release of any reactive load on the actuator piston.

DESCRIPTION OF THE DRAWINGS

For a more complete understanding of the present invention, and for further objects and advantages thereof, reference is now made to the following description taken in conjunction with the accompanying drawings in which.

DESCRIPTION OF THE PREFERRED EMBODIMENTS

Figure 1:
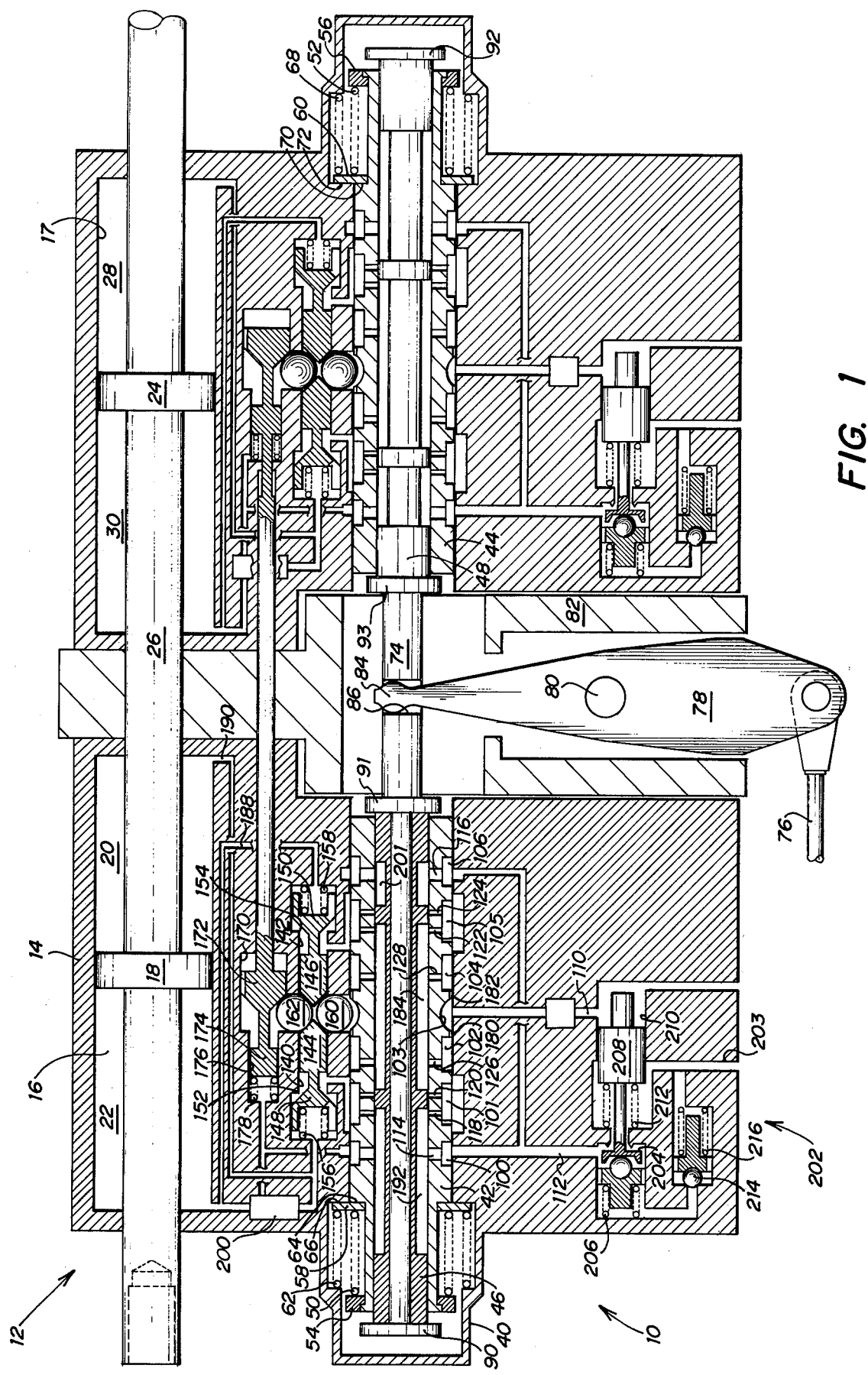
FIG. 1 illustrates a partial sectional view of a servo valve controlled hydraulic actuator embodying the present invention with the control valve mechanism positioned to direct pressurized hydraulic fluid to the left side of the actuator pistons.

In the Drawings, like reference characters designate like or corresponding parts in the several views.

FIG. 1 illustrates a hydraulic servo controlled actuator mechanism having a dual distributor valve system 10. It directs hydraulic fluid to a power actuator 12. Actuator 12 has a housing 14 forming a cylinder 16 in which first power piston 18 operates. Cylinder 16 is divided by piston 18 into pressure chambers 20 and 22. A second power piston 24 is interconnected to the first power piston 18 by actuator output shaft 26 and operates in cylinder 17 of housing 14. Cylinder 17 is divided by piston 24 into pressure chambers 28 and 30. Pistons 18 and 24 necessarily operate in phase and cooperate in sharing the load transmitted through shaft 26 to a central surface (not shown) actuated by movement of shaft 26.

The valve system 10 includes a housing 40 and closely fitted translatable sleeve members 42 and 44 disposed in cylindrical bores in housing 40. Within the sleeve members 42 and 44 are translatable primary servo spools 46 and 48, respectively. Spools 46 and 48 meter hydraulic fluid to power pistons 18 and 24. Springs 50 and 52 engage spring retainers 54 and 56, respectively, to normally position rings 58 and 60, respectively, against a cam surface on sleeves 42 and 44, respectively. Larger diameter end spring 62, concentric with spring 50, acts between housing 40 and ring 58 to urge sleeve 42 to a null position when cam surface 64 on sleeve 42 is in line with cam surface 66 in housing 40. Similarly, larger diameter spring 68 acts on sleeve member 44 to urge the sleeve member to a position where cam surface 70 on sleeve 44 is flush with cam surface 72 of housing 40.

Integral with and interconnecting primary servo spools 46 and 48 is control shaft 74. Shaft 74 is moved in response to the input of a pilot by way of push-pull rod 76. Rod 76 is coupled to a pilot input lever 78 which is pivoted on pin 80 in mount 82. At the end of lever 78 opposite the point of connection between push-pull rod 76 and lever 78 is a ball 84 which operates in aperture 86 through control shaft 74. Thus, movement of push-pull rod 76 by the pilot causes a corresponding movement of spool control shaft 74 and integral primary servo spools 46 and 48. Attached to the end of primary servo spools 46 and 48, and movable therewith, are end plates 90 and 92, respectively.

Sleeve member 42 is formed with circumferential grooves 100-106. Hydraulic fluid is supplied to the groove 103 in sleeve member 42 through supply passageway 110. Grooves 100 and 106 are connected to drain passageway 112. Additionally, grooves 100 and 106 are opened to the inner bore in sleeve member 42 by passageways 114 and 116, respectively. Groove 101 is connected to the interior bore of sleeve member 42 by passageways 118 and 120, and groove 105 is connected to the interior bore of sleeve member 42 by passageways 122 and 124. Grooves 102 and 104 of sleeve member 42 are opened to the interior bore of member 42 by passeways 126 and 128, respectively.

Housing 40 is provided with internal axially aligned cylindrical bores 140 and 142. Pistons 144 and 146 are slidable in 140 and 142, respectively. Pistons 142 and 146 form a fluid tight contact with the walls of bores 140 and 142 and are formed with confronting cone shaped ends. Attached to the opposite ends of pistons 144 and 146 are conical valves 148 and 150, respectively. Valve 148 is normally seated against valve seat 152 by the action of compression spring 156 forcing valve 148 against the seat. Similarly, valve 150 is normally seated against valve seat 154 by the action of compression spring 158 normally seating the valve in valve seat 154. Balls 160 and 162 are positioned in mating relationship with the conical faces of pistons 144 and 146. Slidably positioned within a bore 170 is piston 172 having a conical surface adapted for contact with ball 162. Piston 172 is undersized for bore 170 so that pressure in bore 170 is equalized on both sides of piston 172. Attached to piston 172 is forced piston 174 which moves within bore 176. Piston 172 is normally urged away from ball 162 by the action of compression spring 178 acting on piston 174.

High pressure fluid entering groove 103 through passageway 110 is communicated to the cone shaped face of pistons 144 and 146. As the high pressure fluid acts on these faces of the pistons 144 and 146, the pistons are moved outwardly and valves 148 and 150 are moved to an open position as springs 156 and 158 are compressed. Pressure in groove 103 also exerts a force on piston 174 to compress spring 178. The movement of piston 174 to compress spring 178 causes piston 172 to urge ball 162 downwardly against the cone faces of pistons 144 and 146, thereby adding an additional force tending to open valves 148 and 150.

High pressure fluid from line 110 is communicated to grooves 102 and 104 by passageways 180 and 182, respectively, from circumferential groove 103. High pressure fluid from circumferential grooves 102 and 104 is communicated to groove 184 in primary servo spool 46 through passageways 126 and 128. Groove 184 may be positioned to communicate the high pressure fluid through passageway 122 into groove 105 which communicates through valve 150 to chamber 22 of the first power piston 18. Thus, in a pressurized state, and with the push-pull rod in the position shown in FIG. 1 groove 184 communicates high pressure fluid to groove 105 in sleeve 42, valve 150 will be opened to allow high pressure fluid into chamber 22. Simultaneously, fluid in chamber 20 is allowed to exit through passageway 190 which communicates through valve 148 to groove 101 and through passageway 118 to annular groove 192 in primary servo spool 46. The fluid is communicated from annular groove 192 to drain passageway 112 by passageway 114.

As is seen in FIG. 1, the movement of input lever 78 by push-pull rod 76 translates shaft 74 resulting in the simultaneous movement of servo spool 48 within sleeve member 44 as well as the movement of servo spool 46 within sleeve member 42. The actuator valve system associated with servo spool 48 for applying hydraulic pressure fluid to move piston 24 is identical to that heretofore described in conjunction with servo spool 46. Thus, with the positioning of servo spool 46 to communicate hydraulic fluid pressure against piston 18, serve spool 48 is correspondingly positioned to communicate pressure against piston 24 whereby the hydraulic pressure on both actuator pistons cooperate to translate actuator output shaft 26. Therefore, with the push-pull rod 76 positioning the primary servo spools 46 and 48 in the position shown in FIG. 1, pressure is applied to chambers 22 and 30 causing the movement to the right of pistons 18 and 24 and integral actuator output shaft 26. Movement of shaft 26 in turn varies the pitch of a particular control surface on the aircraft to which it is attached to vary the lift produced by the surface.

As has heretofore been described, the movement of push-pull rod 76 is controlled by the pilot. Movement of rod 76 pivots input lever 78 which in turn causes the movement of spool control shaft 74 and integral primary servo spools 46 and 48. As may be seen in FIG. 2, movement of spool 46 to the left has interrupted communication of fluid pressure to pressure chamber 22 by stopping passageway 122 which had previously communicated fluid pressure through valve 150 and conduit 188 to chamber 22. Movement of servo spool 46 to the left completes the communication of high pressure fluid to pressure chamber 20 by feeding high pressure fluid through circumferential groove 184 through valve 148 by way of passageway 120 in sleeve 42 and groove 101 in sleeve 42. Pressure is communicated through valve 148 through passageway 190 to pressure chamber 20. Thermal relief valve 200 is a one way valve between line 190 and pressure chamber 22, and prevents the over pressurization of chamber 22 through passageway 190 due to increasing temperature. Simultaneous with the pressurization of chamber 20, pressure chamber 22 is depressurized by the flow of fluid out of the chamber through conduit 188 past valve 150 and into passageway 124 which is in communication with annular chamber 201 in servo spool 46. Annular chamber 201 communicates with drain passageway 112.

Thus, it may be seen that movement of the primary servo spool 46 to the left introduces high pressure fluid into chamber 20 while permitting egress of fluid from chamber 22, therefore forcing piston 18 to move to the left in cylinder 16. A concomitant movement of actuator output piston 24 occurs with the movement of piston 18. Likewise, the same movement of servo spool 48 within sleeve member 44 on the opposite side of input lever 78 in housing 40 causes a pressurization of pressure chamber 28 and a depressurization of pressure chamber 30 resulting in a force on piston 24 similar to that experienced by piston 18.

A check valve 202, FIG. 1, is positioned between drain passageway 112 and hydraulic fluid return line 203 and serves to restrict flow to one direction only, that is, out of the system from passageway 112 to return line 203. Check valve 202 provides two channels of communication from drain passageway 112 to return line 203. Flow through the first channel is controlled by valve 204 which is closed in the fluid pressure loss made by the action of compression spring 206 on the valve. Valve 204 is opened by the action of cylinder 208 which forms a fluid tight but slidable engagement within a chamber 210 interconnecting fluid supply passageway 110 and drain passageway 112. Thus, one face of cylinder 208 communicates with and is exposed to the high fluid pressure brought into the system through supply passageway 110. The opposite face of cylinder 208 is attached to valve 204 and communicates with a compression spring 212 which acts to close valve 204. As hydraulic fluid pressure is brought into the system through passageway 110, the pressure acts on the face of cylinder 208 exposed thereto, thereby causing cylinder 208 to compress spring 212 and open valve 204. As is seen in FIG. 1, with valve 204 open, fluid may flow through drain passageway 112, around the portion of cylinder 208 joined to valve 204 and out of return line 203.

Where the combined pressure of spring 212 and fluid 206 is greater than that of the high pressure introduced through passageway 110, cylinder 208 and valve 204 will be moved to seat valve 204 in a closed position. In this mode, however, fluid may still flow out of the system through a second channel of communication between drain passageway 112 and return line 203. In transversing this second channel, fluid flows behind closed valve 204 and against valve 214 which is normally closed by the action of compression spring 216 acting thereon. Where the fluid pressure is sufficient to overcome the sealing capability of spring 216, fluid will unseat valve 214 to allow flow of fluid around valve 214 and out of return line 203.

Fluid is prevented from moving in the reverse direction, that is from return line 203 to drain passageway 112 by the arrangement of components in check valve 202. Reverse flow through the first channel of communication between passageway 112 and line 203 is restricted by the force of springs 206 and 212 on valve 204 and cylinder 208, respectively, and by the pressure which would be exerted on cylinder 208 by the fluid. Reverse flow through the second channel of communication between passageway 112 and line 203 is prevented by the force of spring 216 on valve 214 and the fluid pressure which would be exerted on the back side of valve 214. Check valve 220 is similarly positioned in passageway 110 and is of the conventional one way valve design. Thus, valve 220 allows fluid to flow into the system while preventing a reverse flow of fluid through passageway 110.

Figure 3:
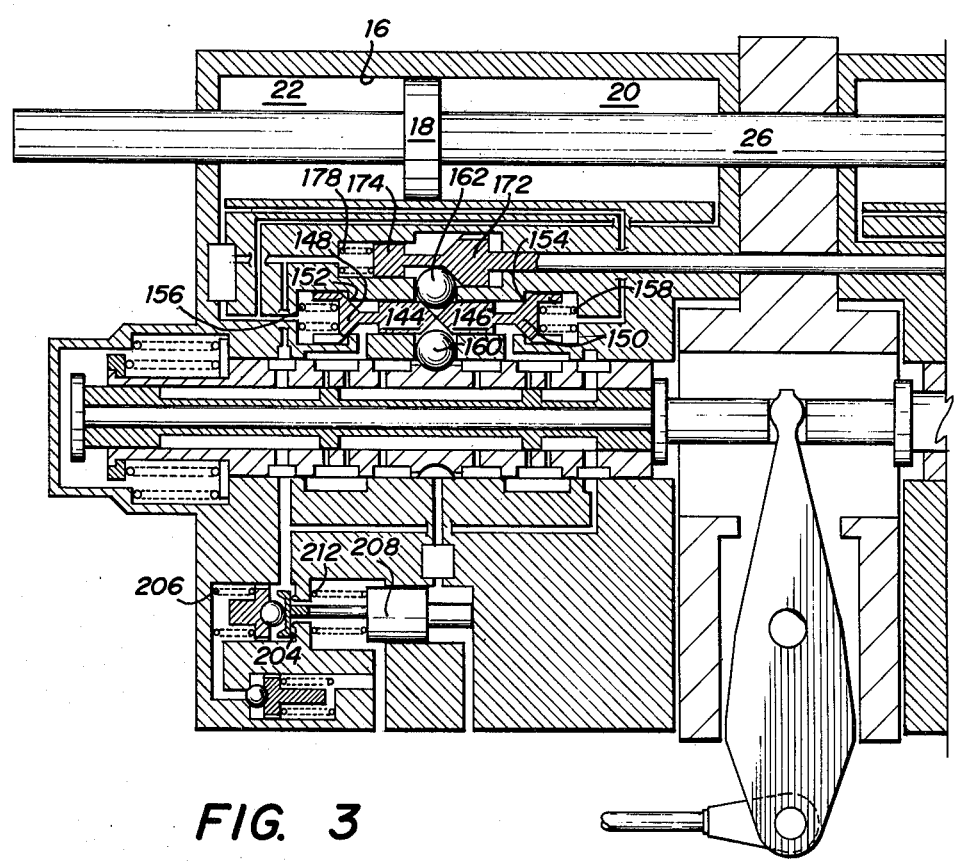
FIG. 3 illustrates a sectional view of a portion of the hydraulic actuator of FIG. 1 in a hydraulic pressure loss mode.

While the present system provides for the control of the movement of the actuator output piston by the pilot through the selective pressurization of cylinder chambers of the power actuator, a primary purpose of the present invention is to further provide a servo controlled actuator capable of maintaining a reactive load after a hydraulic pressure failure. Referring to FIG. 3, loss of hydraulic pressure in the present system results in the loss of pressure against the conical faces of pistons 144 and 146 and the corresponding movement of valves 148 and 150 against valve seats 152 and 154, respectively, by the action of compression springs 156 and 158 acting on the valves. Likewise, the loss of pressure results in the loss of the pressure force exerted on force piston 174, and therefore, the corresponding movement of the piston 174 and adjoining piston 172 by the action of compression spring 178. The movement of piston 172 away from ball 162 permits the cone faces of pistons 144 and 146 to move together, forcing ball 162 upwardly while permitting valves 148 and 150 to seat against valve seats 152 and 154. Thus, fluid in chamber 20 and chamber 22 of cylinder 16 of the actuator will be frozen at the level existing at the time of hydraulic pressure failure, and actuator piston 18 will be locked in its pressure failure position. As a result, piston 18 will resist any reactive loading experienced by the control surfaces and transmitted to piston 18 through output shaft 26. Because identical structure is employed in the valve mechanism associated with the control of hydraulic fluid to piston 24, fluid in pressure chambers 28 and 30 will likewise be maintained at the level existing at the time of hydraulic failure. Therefore, any reactive loading experienced by pistons 18 and 24 from the actuator output shaft 26 will be resisted by preventing flow of hydraulic fluid from the cylinder chambers in which pistons 18 and 24 move.

Figure 4:
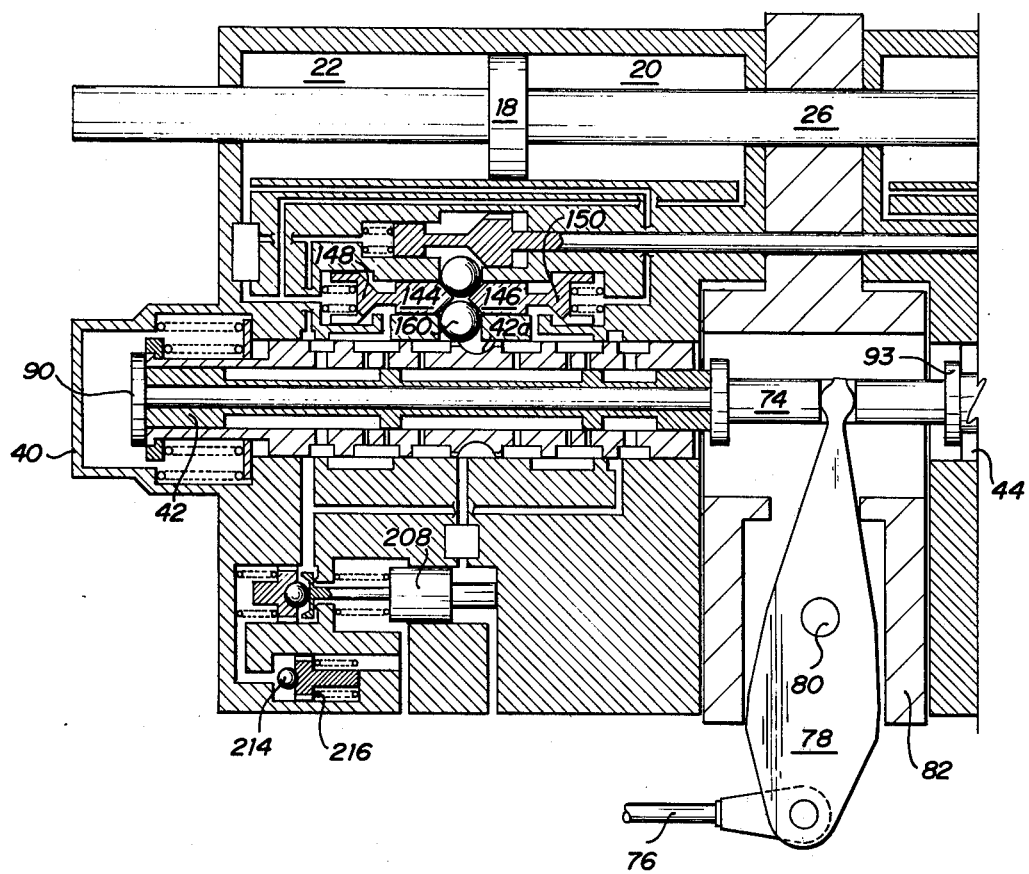
FIG. 4 illustrates a sectional view of a portion of the hydraulic actuator of FIG. 1 in a hydraulic pressure loss mode with the control valve mechanism in the override position.

The system further provides for permitting the movement of actuator output shaft 26 in response to reactive loads experienced on the airplane control surfaces during a hydraulic pressure failure mode. This is accomplished by disengaging valves 148 and 150. As is shown in FIG. 4, disengagement of these valves is accomplished by movement of control shaft 74 beyond its normal range to engage end plate 90 and control shaft flange 93 against sleeve member 42 and 44, respectively, within housing 40. Stroking of sleeve members 42 and 44 within housing 40 displaces ball 160 upwardly against the conical surfaces of pistons 144 and 146 resulting in the opening of valves 148 and 150 to allow pressure in chambers 20 and 22 to equalize in accordance with the reactive loading exerted on piston 18 by actuator output shaft 26.

Referring to FIG. 4, it is seen that the opening of valves 148 and 150 in this way is solely by mechanical means. The stroking of sleeve member 42 forces ball 160 upwardly out of its normally seated position in indentation 42a in sleeve member 42. As ball 160 is forced upwardly, it bears against the conical faces of pistons 144 and 146 thereby separating cylinders and opening valves 148 and 150 attached thereto. Similarly, the movement of sleeve member 44 in housing 40 results in the opening of the valves controlling the flow of hydraulic fluid to chambers 28 and 30 allowing free movement of piston 24 within the cylinder under the action of forces on the actuator output shaft 26.

It will be seen that ball 160 is likewise displaced by the movement of sleeve member 42 by the movement of control shaft 74 to the left. This displacement of ball 160 likewise forces the movement of pistons 144 and 146 and the concomitant opening of valves 148 and 150 to permit passage of fluid to and from the chambers in the actuator. Similarly, a corresponding leftward movement of sleeve member 44 in housing 40 opens the lines to chambers 28 and 30 to allow free movement of piston 24 within the cylinder in accordance with forces on actuator output shaft 26.

Thus, the present invention discloses a hydraulic actuator consisting of two balanced area actuator pistons. Each actuator piston is controlled by the movement of a primary servo sleeve which is adapted to supply pressurized fluid from a pressure fluid source to one side of the actuator piston and to allow return flow from the opposite side of the piston. The movement of the actuator piston is reversed by translation of the primary servo sleeve within the actuator housing.

Included in the valve means for each tandem actuator piston is a blocking or shut off valve in each flow line between the servo sleeve and the cylinders in which each piston moves. A flow channel from the pressure fluid source applies pressure to the shut off valves to maintain the valves normally open for flow of control fluid to and from the actuator pistons. Means, operable upon loss of fluid pressure, are provided for closing the shut off valves to maintain existing pressure on both sides of the actuator pistons during a pressure loss mode. In this way, the valves are automatically engaged to maintain reactive loads in each actuator half when there is a loss in hydraulic pressure to both sides of the tandem actuator. Failure of one half of the tandem valve shown in FIG. 1 does not cause blockage in other half because of the linkage provided between the halves comprising piston 172. Piston 172 is pressure operated. If the left half fails, for example, the pressure provided by the right half on piston 172 will cause ball 162 to be forced downward, thus forcing elements 144 and 146 apart. Only if both halves fail will there be blockage. If only one half is employed, piston 172 and ball 162 would not be needed.

During pressure failure mode, disengagement of the shut off valves may be accomplished by stroking a secondary spool associated with the primary servo spool and responsive to over travel of the primary servo spool. Stroking of the secondary spool displaces a ball or cam which in turn mechanically displaces the shut off valves to allow passage of fluid to and from the actuator cavities thereby permitting an equalization of pressure on both sides of the actuator piston. Thus, the system permits the pilot to release the reactive loading sustained by the actuator pistons as a result of forces on the control surfaces and thereby bring the control surfaces to new position.

Whereas the present invention has been described with respect to specific embodiments thereof, it will be understood that various changes and modifications will be suggested to one skilled in the art, it is intended to encompass such changes and modifications as fall within the scope of the appended claims.

What is claimed is:

1. A valve system for controlling the flow of fluid from a pressure fluid source to a hydraulic actuator having an actuator piston which comprises:

a primary spool responsive to translation in a control range to supply pressurized fluid from said pressure fluid source to one side of said piston and receive fluid flow from the other side of said piston, a plurality of blocking valves in fluid communication with said primary spool and said piston, means operable when said spool is in said control range and pressurized fluid is present in said system for maintaining said blocking valves open and operable when said spool is in said control range and upon loss of pressurized fluid for closing said blocking valves to prevent movement of said piston during pressure loss, thereby permitting said piston to resist reactive loads exerted thereon, and means associated with said primary spool and responsive to over travel of said primary spool outside of said control range to open said blocking valves, thereby equalizing pressure on both sides of said piston to permit movement of said piston during a pressure failure.

2. The valve system of claim 1 and further comprising:

a piston member operable by the pressure fluid from said pressure fluid source, and cam means operable in response to movement of said piston member for opening said blocking valves.

3. The valve system of claim 2 wherein said cam means are spherical balls and said blocking valves are formed with a conical face upon which said spherical balls act, and wherein said piston member is comprised of a force piston having a conical face piston attached thereto, said conical face acting against said spherical balls as said actuator piston is translated such that said spherical balls open said blocking valves.

4. The valve system of claim 1 wherein said means associated with said primary spool includes a sleeve member associated with said primary spool and responsive to over travel of said primary spool to unseat said blocking valves.

5. In a servo valve controlled hydraulic actuator having both an actuator piston housed within a cylinder and a servo spool translatable in a control range for metering hydraulic fluid from a pressure source to said cylinder the combination which comprises:

a pair of opposed blocking valves in fluid communication with said cylinder and said servo spool, means operable when said spool is in said control range and pressurized fluid is present in said system for maintaining said blocking valves open and operable when said spool is in said control range and upon loss of pressurized fluid for closing said blocking valves to prevent movement of said piston during pressure loss, thereby permitting said piston to resist reactive loads exerted thereon, and structure including a manually actuated sleeve member associated with said servo spool and responsive to over travel of said servo spool to unseat both of said blocking valves to permit movement of the actuator piston for equalizing pressure on both sides of the actuator piston during pressure failure wherein the actuator piston is moved by reactive forces.

6. The hydraulic actuator of claim 5 and further comprising:
a piston member operable in response to the fluid pressure from said source, and
cam means operable in response to movement of said piston member for opening said blocking valves.

7. The hydraulic actuator of claim 6 wherein said cam means are spherical members and said blocking valves are formed with a conical face upon which said spherical members act, and
wherein said piston member includes a force piston, and an adjoined piston having a conical face for acting upon one of said spherical members to open said blocking valves.

8. In a servo valve controlled hydraulic actuator having both an actuator piston housed within a cylinder, and a servo spool for metering hydraulic fluid from a pressure source to said cylinder, the combination which comprises:
a pair of opposed blocking valves in a fluid communication with said cylinder and said servo spool,
structure having a flow path leading from said source for applying pressure on said blocking valves for maintaining said blocking valves normally open,
structure including a manually actuated sleeve member associated with said servo spool and responsive to over travel of said servo spool to unseat both of said blocking valves to permit movement of the actuator piston for equalizing pressure on both sides of the actuator piston during pressure failure wherein the actuator piston is moved by reactive forces,
spring means acting upon said blocking valves for closing said blocking valves upon loss of pressure from said source, and
said blocking valves being opened by the action of a cam means forced therebetween by the movement of said sleeve member wherein said blocking valves are opened mechanically to permit movement of the actuator piston during pressure failure by reactive forces acting thereon.

9. In the hydraulic actuator of claim 8 wherein said cam means are spherical balls, and said blocking valves are unseated by movement of said sleeve member to force one of said spherical balls against opposing faces of said blocking valves to open said blocking valves and permit the free flow of fluid from the cylinder housing said actuator piston wherein said actuator piston moves in response to reactive forces experienced by the actuator piston.

* * * * *

UNITED STATES PATENT AND TRADEMARK OFFICE
CERTIFICATE OF CORRECTION

PATENT NO. : 4,128,047

DATED : December 5, 1978

INVENTOR(S) : Jose G. Caero

It is certified that error appears in the above-identified patent and that said Letters Patent are hereby corrected as shown below:

Column 2, line 27, "consist" should be --consists--.

Column 3, line 37, after "respectively." add --Control shaft flanges 91 and 93 are attached at the point of connection of spool control shaft 74 to primary servo spools 46 and 48, respectively.--

Column 3, line 50, "passeways" should be --passageways--.

Column 3, line 53, after "slidable in" add --bores--.

Column 3, line 53, "Pistons 142" should be --Pistons 144--.

Column 4, line 1, "forced" should be --force--.

Column 4, line 17, "line" should be --passageway--.

Column 5, line 7, "line" should be --passageway--.

Column 5, line 36, "made" should be --mode--.

Column 5, line 55, "fluid" should be --spring--.

Column 6, line 50, after "hydraulic" add --pressure--.

Signed and Sealed this

Twelfth Day of June 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,128,047
DATED : Dec. 5, 1978
INVENTOR(S) : Jose G. Caero

It is certified that error appears in the above-identified patent and that said Letters Patent are hereby corrected as shown below:

In the drawings, Sheet 1, Fig. 1, add the reference numeral 220, and add the reference numeral 16 to refer to the cylinder wall and not to the chamber enclosed by the cylinder.

Figure 2:
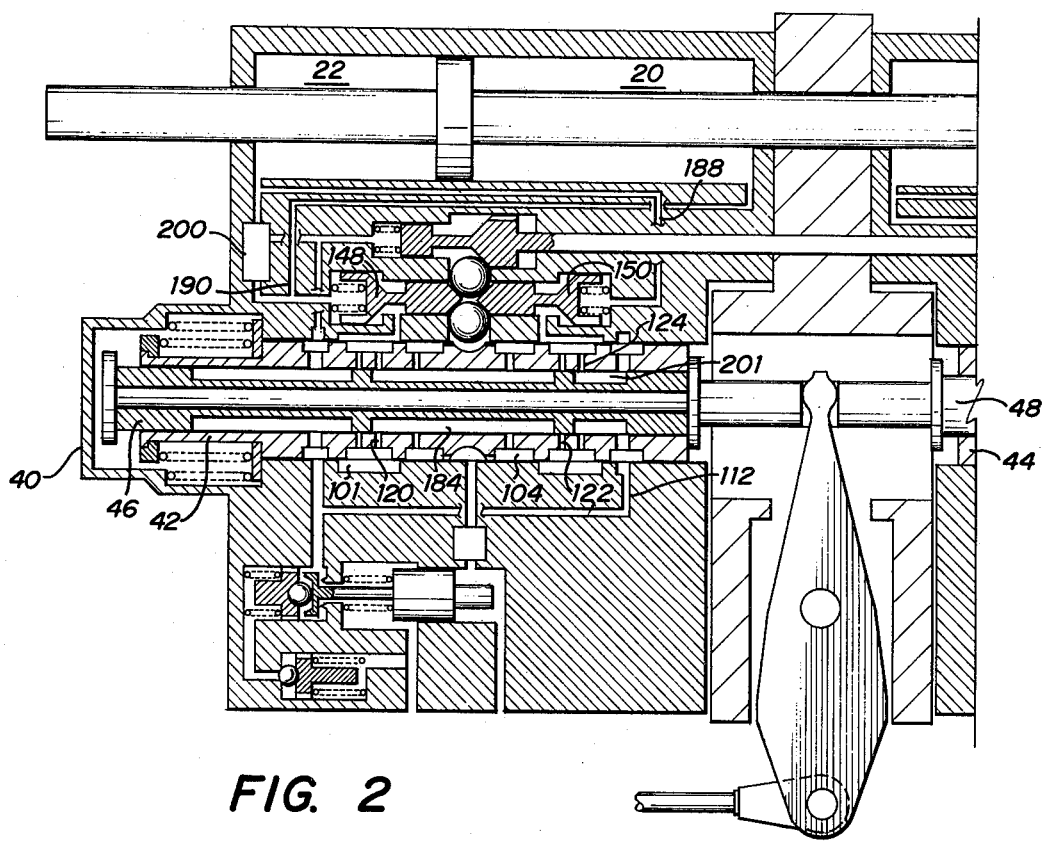
FIG. 2 illustrates a sectional view of a portion of the hydraulic actuator of FIG. 1 with the control valve mechanism positioned to direct pressurized hydraulic fluid to the right side of the actuator pistons.

Sheet 2, Fig. 2, add the reference numeral 18 to refer to the actuator piston, and add the reference numeral 16 to refer to the cylinder wall enclosing piston 18. In addition, add the reference numeral 105 to refer to the groove immediately above passageway 122, and add the reference numeral 110 to refer to the supply passageway.

Sheet 2, Fig. 3, add the reference numeral 110 to refer to the supply passageway.

In Fig. 1-4, delete the line closing the port into return line 203.

Signed and Sealed this

Eighteenth Day of September 1979

[SEAL]

Attest:

LUTRELLE F. PARKER
Attesting Officer    Acting Commissioner of Patents and Trademarks